United States Patent
Rajagopalan et al.

(10) Patent No.: US 6,192,154 B1
(45) Date of Patent: Feb. 20, 2001

(54) TWO-PASS ENCODING METHOD OF DIGITAL MOTION VIDEO SEQUENCES FOR CONSTANT-OR VARIABLE BIT RATE

(75) Inventors: Rajesh Rajagopalan, Bedminster, NJ (US); Peter Westerink, Ossining, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/013,149

(22) Filed: Jan. 26, 1998

(51) Int. Cl.[7] .............................. G06K 9/36; H04N 9/083
(52) U.S. Cl. ............................................. 382/232; 348/390
(58) Field of Search ................................. 382/232, 233, 382/236, 239, 244, 251, 252; 358/133, 141, 426, 432, 433; 375/232, 233, 240; 348/390, 397–398

(56) References Cited

U.S. PATENT DOCUMENTS 5,164,993 * 11/1992 Capozzi et al. .................... 364/413.3
5,231,484 * 7/1993 Gonzales et al. ..................... 358/133

* cited by examiner

Primary Examiner—Jose L. Couso
Assistant Examiner—Duy M. Dang
(74) Attorney, Agent, or Firm—Daniel P. Morris

(57) ABSTRACT

Systems and methods are provided for encoding units of digital information such as pictures, whereby all the data is first analyzed by running a compression pass over all the data, using the in the encoder embedded rate control mechanism. Picture attributes, such as quantization scale setting and bits produced will be extracted from the resulting bitstream, and analyzing this, indiviudal unit (picture) quantization scale and bit allocation settings are prepared for a next pass for either a constant- or variable bit rate, whereby buffer boundaries are observed. In a second compression pass through the same data, a constant- or variable bit rate compressed bitstream is produced, but this time bypassing the embedded rate control mechanism, and using the prepared picture bit allocation and quantization scale settings instead. Additionally, a mechanism will supervise the total bit production accuracy.

2 Claims, 7 Drawing Sheets

Group Of Pictures
n

Group Of Pictures
n + 1

TWO-PASS ENCODING METHOD OF DIGITAL MOTION VIDEO SEQUENCES FOR CONSTANT-OR VARIABLE BIT RATE

FIELD OF THE INVENTION

The present invention relates to the field of data compression and, more particularly, to systems and methods for compressing digital motion video signals.

BACKGROUND OF THE INVENTION

Technological advances in digital transmission networks, digital storage media, Very Large Scale Integration devices, and digital processing of video and audio signals are converging to make the transmission and storage of digital video economical in many applications. Because the storage and transmission of digital video signals are central to many applications, and because an uncompressed representation of a video signal typically requires a large amount of storage, the use of digital video compression techniques is important to this advancing art.

Several international standards for the compression of digital video signals have emerged over the past decade, with more currently under development. These standards apply to algorithms for the transmission and storage of compressed digital video in a variety of applications, including: video-telephony and teleconferencing; high-quality digital television transmission via coaxial networks, fiber-optic networks, terrestrial broadcast or direct satellite broadcast; and in interactive multimedia products stored on CD-ROM, Digital Tape, Digital Video Disk, and disk drives.

Several of the compression standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms were developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standards specify the syntax of the compressed bit stream and the method of decoding, but leave considerable latitude for novelty and variety in the algorithm employed in the encoder.

The MPEG-1 standard was developed for use in compressing progressive video. A progressive video sequence is a sequence in which each frame represents a scene as it is viewed at a discrete time instance. By contrast, for interlaced video, a field—every other line on the screen—is captured periodically. For interlaced video, at alternating time instances the top and bottom field on a screen is refreshed. At any given time, data from two fields (a frame) can be seen.

The MPEG-2 standard, can be used to compress either interlaced video, progressive video, or a mixture of progressive and interlaced video: the encoder specifies whether each frame is progressive or interlaced. The MPEG standards specify a bit stream in which the number of bits in the compressed representation of each picture is variable. This variation is due to the different types of picture processing, as well as the inherent variation with time of the spatio-temporal complexity of the scene being coded. This leads to the use of buffers to even out the fluctuations in bit rate. For a constant-bit-rate storage media or transmission channel, for example, buffering allows the bit rate of the compressed pictures to vary within limits that depend on the size of the buffers, while outputting a constant bit rate to the storage device or transmission channel.

Considering the importance of buffering, the MPEG standards define a hypothetical decoder called the Virtual Buffer Verifier (VBV), diagramed in FIG. 1, that verifies whether an encoded bit stream is decodable with specified limitations on the decoder buffer size and the input bit rate. The VBV has two modes of operation: constant bit rate (CBR) and variable bit rate (VBR). The two modes are described below.

For constant-bit-rate operation, the Decoder Buffer 101 is filled at a constant bit rate with compressed data 100 from the storage or transmission medium. Both the buffer size and the bit rate are parameters that are transmitted in the compressed bit stream. After an initial delay, which is also derived from information in the bit stream, a hypothetical decoder 103 instantaneously removes from the buffer all of the data associated with the first picture. Thereafter, at intervals equal to the picture rate of the sequence, the decoder removes all data associated with the earliest picture in the buffer.

Variable-bit-rate operation is similar to the above, except that the compressed bit stream enters the buffer at a specified maximum bit rate until the buffer is full, at which point no more bits are input until the buffer at least partially empties. This translates to a bit rate entering the buffer that is effectively variable.

In order for the bit stream to satisfy the MPEG rate-control requirements, it is necessary that all the data for each picture be available within the buffer at the instant it is needed by the decoder. This requirement translates to upper and lower bounds (UVBV and LVBV) on the number of bits allowed in each picture. The upper and lower bounds for a given picture depend on the number of bits used in all the pictures preceding it. It is the function of the encoder to produce bit streams that satisfy the VBV requirements. It is not expected that actual decoders will necessarily be configured or operate in the manner described above. The hypothetical decoder and its associated buffer are simply a means of placing computable limits on the size of compressed pictures.

A rate control scheme can be found in U.S. Pat. No. 5,231,484 to Gonzales and Viscito, which describes a rate control mechanism that can be used for MPEG. A block diagram for this type of scheme is shown in FIG. 2. In this scheme, the input video signal Fk 200 is sent to a Complexity Estimator 201 and a Picture Coder 205. The Complexity Estimator sends a complexity estimate Ck (signal 202) to a Picture Bit Allocator 203. The Picture Bit Allocator sends the quantization scale Qk (signal 204) to the Picture Coder 205. The quantization scale is set depending on the instantaneous buffer fullness of a hypothetical decoder buffer which will be receiving the compressed video signals from the encoder and the complexity of the previously encoded pictures. The Picture Coder uses the quantization scale to encode Fk and produce an output bit stream CDk (signal 206).

SUMMARY OF THE INVENTION

With respect of the above, it is an object of the present invention to provide a system and techniques for encoding units of digital information such as pictures, whereby all the data is first analyzed by running a compression pass over all the data, using the in the encoder embedded rate control mechanism. Then, using the analysis results, individual unit (picture) quantization scales and bit allocation settings are prepared for a next pass for either a constant- or variable bit rate. And finally, in a second compression pass through the same data, a constant- or variable bit rate compressed bitstream is produced, but this time bypassing the embedded rate control mechanism, and using the prepared picture bit allocation and quantization scale settings instead, in combination with a method to supervise the bit production accuracy.

In various embodiments, methods are provided for analyzing the initial compression pass data, using its results for preparing the bit production and quantziation scale targets for a second compression pass for either constant- or variable bit rate, and controlling the actual second compression pass process on a picture by picture basis.

DETAILED DESCRIPTION OF THE PREFERRED EMBODIMENTS a. The MPEG-2 Environment

As the present invention may be applied in connection with an MPEG-2 encoder, in order to facilitate an understanding of the invention, some pertinent aspects of the MPEG-2 video compression standard will be reviewed. It is to be noted, however, that the invention can also be applied to other video coding algorithms which share some features of the MPEG-2 standard.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings that have minimal length in some sense; and 3) the concatenation of the strings in a well-defined order. Steps 2 and 3 are lossless; i.e., the original data is faithfully recoverable upon reversal. Step 2 is known as entropy coding.

Step 1 can be either lossless or lossy. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 standard for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG video standards specify a coded representation of video for transmission. The standards are designed to operate on interlaced or noninterlaced component video. Each picture has three components: luminance (Y), red color difference (CR), and blue color difference (CB). For 4:2:0 data, the CR and CB components each have half as many samples as the Y component in both horizontal and vertical directions. For 4:2:2 data, the CR and CB components each have half as many samples as the Y component in the horizontal and direction but the same number of samples in the vertical direction. For 4:4:4 data, the CR and CB components each have as many samples as the Y component in both horizontal and vertical directions.

An MPEG data stream consists of a video stream and an audio stream that are packed, with systems information and possibly other bit streams, into a systems data stream that can be regarded as layered. Within the video layer of the MPEG data stream, the compressed data is further layered. A description of the organization of the layers will aid in understanding the invention.

Figure 3:
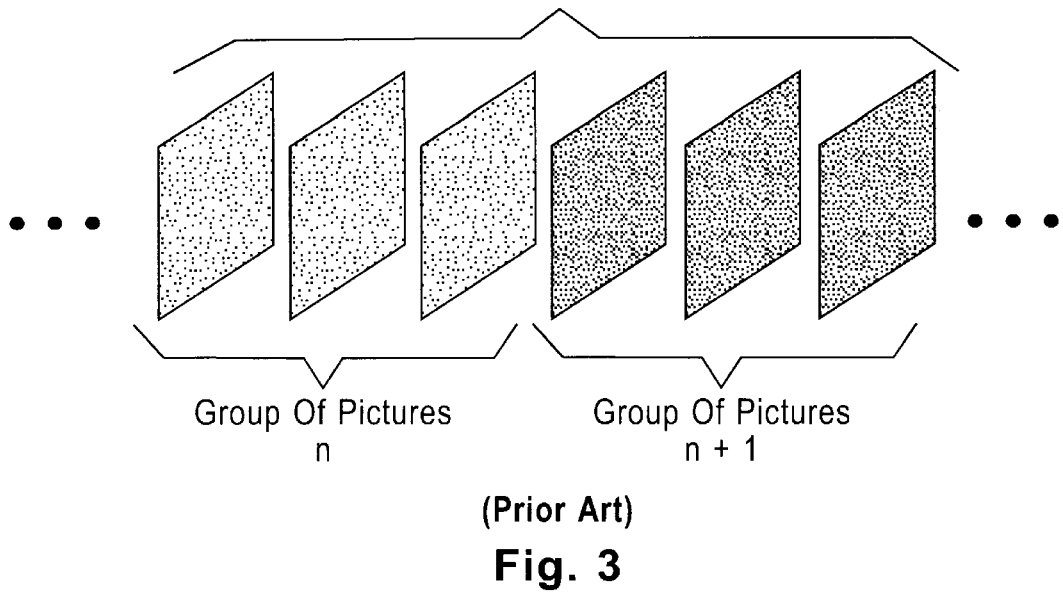
FIG. 3 shows an exemplary set of Group of Pictures (GOP's) layer of compressed data within the video compression layer of an MPEG data stream.

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 3. Decoding may begin at the start of any GOP, essentially independent of the preceding GOP's. There is no limit to the number of pictures that may be in a GOP, nor do there have to be equal numbers of pictures in all GOP's.

Figure 4:
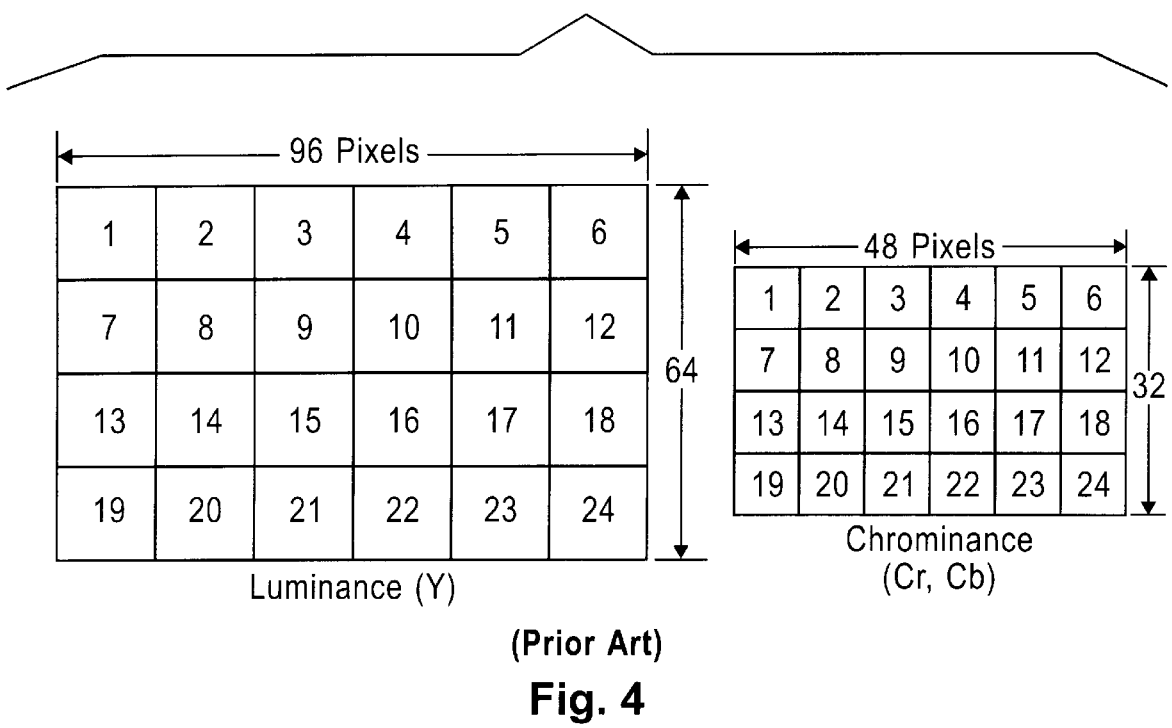
FIG. 4 shows an exemplary Macroblock (MB) subdivision of a picture in the MB layer of compressed data within the video compression layer of an MPEG data stream.

The third or "Picture" layer is a single picture. A general illustration of this layer is shown in FIG. 4. The luminance component of each picture is subdivided into 16×16 regions; the color difference components are subdivided into appropriately sized blocks spatially co-situated with the 16×16 luminance regions; for 4:4:4 video, the color difference components are 16×16, for 4:2:2 video, the color difference components are 8×16, and for 4:2:0 video, the color difference components are 8×8. Taken together, these co-situated luminance region and color difference regions make up the fifth layer, known as "macroblock" (MB). Macroblocks in a picture are numbered consecutively in raster scan order.

Between the Picture and MB layers is the fourth or "Slice" layer. Each slice consists of some number of consecutive MB's. Slices need not be uniform in size within a picture or from picture to picture.

Figure 5:
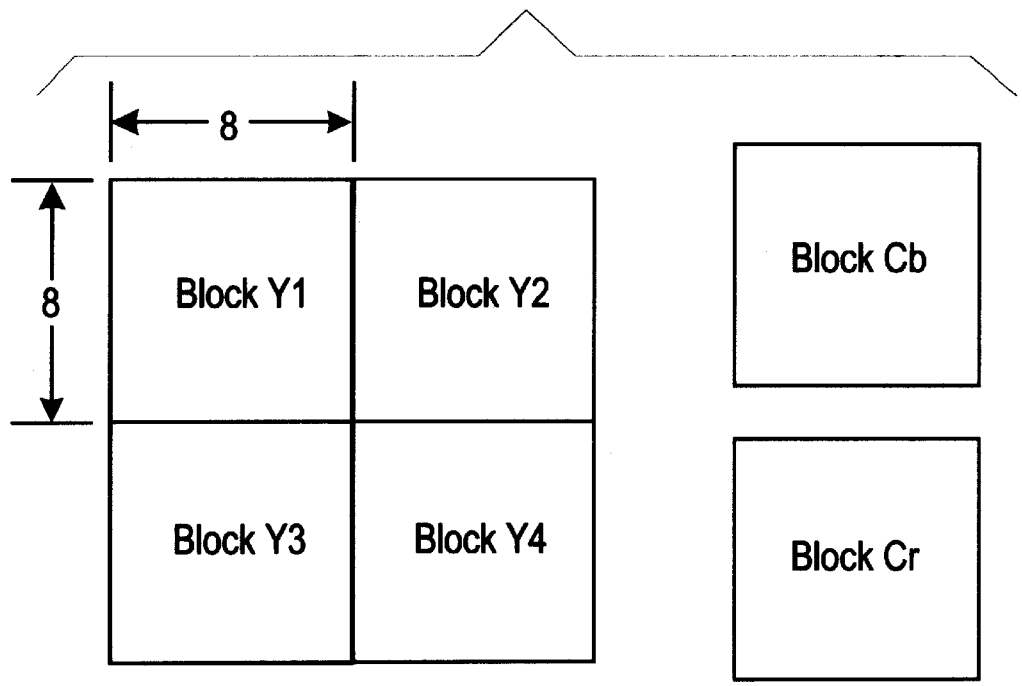
FIG. 5 shows the Block subdivision of a Macroblock.

Finally, as shown in FIG. 5, each MB consists of four 8×8 luminance blocks and 8, 4, or 2 (for 4:4:4, 4:2:2 and 4:2:0 video) chrominance blocks. If the width of the luminance component in picture elements or pixels of each picture is denoted as C and the height as R (C is for columns, R is for rows), a picture is C/16 MB's wide and R/16 MB's high.

The Sequence, GOP, Picture, and Slice layers all have headers associated with them. The headers begin with bytealigned "Start Codes" and contain information pertinent to the data contained in the corresponding layer.

A picture can be either field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a frame-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of two fields.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2.

Figure 6:
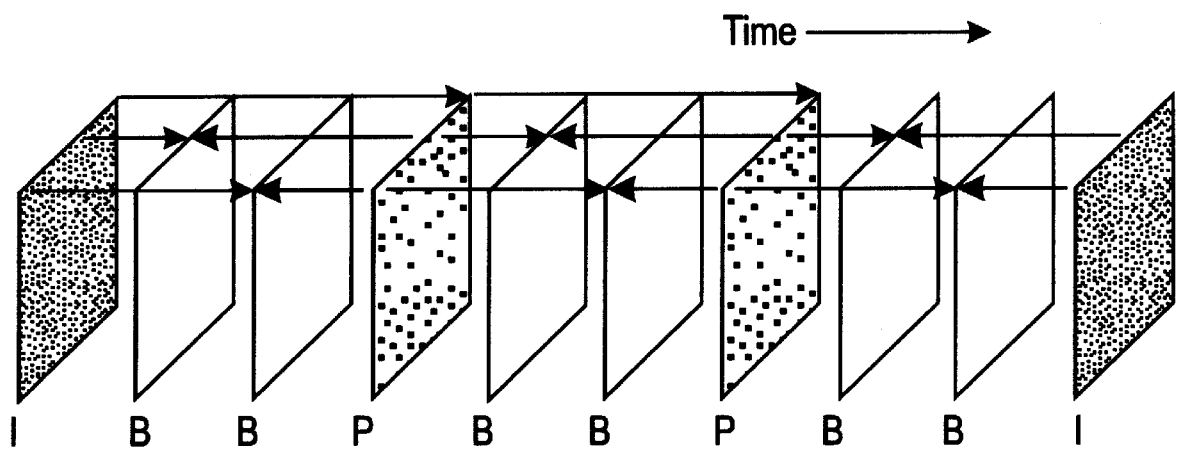
FIG. 6 shows the type of Pictures in a typical Group of Pictures.

Within a GOP, three "types" of pictures can appear. An example of the three types of pictures within a GOP is shown in FIG. 6. The distinguishing feature among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P-pictures) are reconstructed from the compressed data in that picture and two most recently reconstructed fields from previously displayed I- or P-pictures. Bidirectionally motion-compensated pictures (B-pictures) are reconstructed from the compressed data in that picture plus two reconstructed fields from previously displayed I- or P-pictures and two reconstructed fields from I- or P-pictures that will be displayed in the future. Because reconstructed I- or P-pictures can be used to reconstruct other pictures, they are called anchor pictures. For purposes of this specification, an anchor picture is called a terminal picture if the next anchor picture is an I-picture.

One very useful image compression technique is transform coding. In MPEG and several other compression standards, the discrete cosine transform (DCT) is the transform of choice. The compression of an I-picture is achieved by the steps of 1) taking the DCT of blocks of pixels, 2) quantising the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantization of the DCT coefficients, is the primary source of lossiness in the MPEG standards. Denoting the elements of the two-dimensional array of DCT coefficients by cmn, where m and n can range from 0 to 7, aside from truncation or rounding corrections, quantization is achieved by dividing each DCT coefficient cmn by wmn X QP, with wmn being a weighting factor and QP being the macroblock quantizer. Note that QP is applied to each DCT coefficient. The weighting factor wmn allows coarser quantization to be applied to the less visually significant coefficients.

There can be several sets of these weights. For example, there can be one weighting factor for I-pictures and another for P- and B-pictures. Custom weights may be transmitted in the video sequence layer, or default values may be used. The macroblock quantizer parameter is the primary means of trading off quality vs. bit rate in MPEG-2. It is important to note that QP can vary from MB to MB within a picture. This feature, known as adaptive quantization (AQ), permits different regions of each picture to be quantised with different step-sizes, and can be used to equalize (and optimize) the visual quality over each picture and from picture to picture. Typically, for example in MPEG test models, the macroblock quantizer is computed as a product of the macroblock masking factor and the picture nominal quantizer.

Following quantization, the DCT coefficient information for each MB is organized and coded, using a set of Huffman codes. As the details of this step are not essential to an understanding of the invention and are generally understood in the art, no further description will be offered here. Most video sequences exhibit a high degree of correlation between consecutive pictures. A useful method to remove this redundancy before coding a picture is motion compensation. MPEG-2 provides several tools for motion compensation (described below).

All the methods of motion compensation have the following in common. For each macroblock, one or more motion vectors are encoded in the bit stream. These motion vectors allow the decoder to reconstruct a macroblock, called the predictive macroblock. The encoder subtracts the predictive macroblock from the macroblock to be encoded to form the difference macroblock. The encoder uses tools to compress the difference macroblock that are essentially similar to the tools used to compress an intra macroblock.

The type of picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used.

Figure 1:
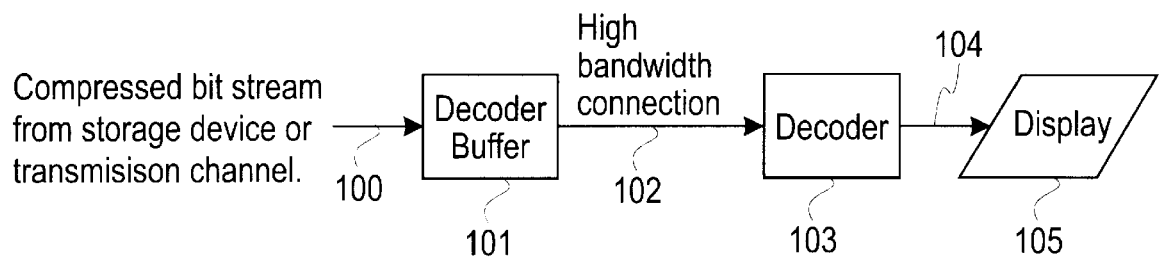
FIG. 1 is a block diagram of a Virtual Buffer Verifier.

The MPEG standards can be used with both constant-bit-rate and variable-bit-rate transmission and storage media. The number of bits in each picture will be variable, due to the different types of picture processing, as well as the inherent variation with time of the spatio-temporal complexity of the scene being coded. The MPEG standards use a buffer-based rate control strategy, in the form of a Virtual Buffer Verifier (VBV), to put meaningful bounds on the variation allowed in the bit rate. As depicted in FIG. 1, the VBV is devised as a decoder buffer 101 followed by a hypothetical decoder 103, whose sole task is to place bounds on the number of bits used to code each picture so that the overall bit rate equals the target allocation and the short-term deviation from the target is bounded. The VBV can operate in either constant-bit-rate or variable-bit-rate mode.

In constant-bit-rate mode, the buffer is filled at a constant bit rate with compressed data in a bit stream from the storage or transmission medium. Both the buffer size and the bit rate are parameters that are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 7:
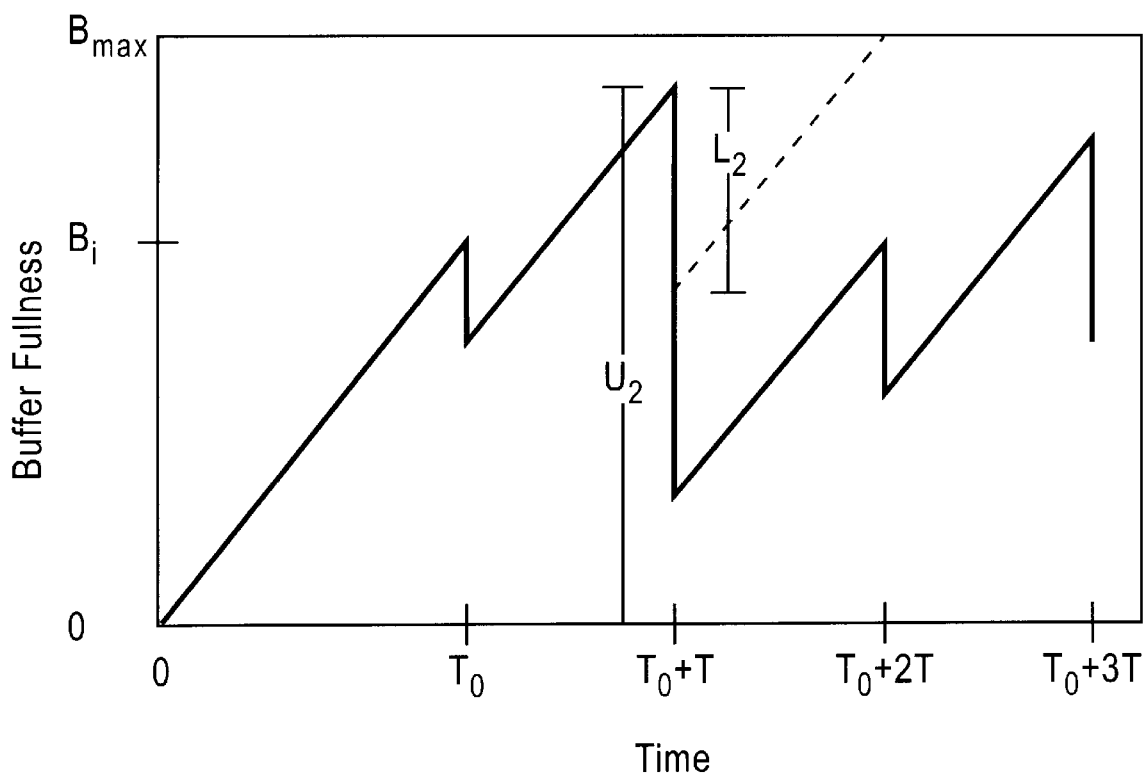
FIG. 7 shows an exemplary plot of the evolution of a virtual decoder buffer over time for operation in constant-bit-rate mode.

The operation of the VBV is shown by example in FIG. 7. The figure depicts the fullness of the decoder buffer over time. The buffer starts with an initial buffer fullness of Bi after an initial delay of time T0. The sloped line segments show the compressed data entering the buffer at a constant bit rate. The vertical line segments show the instantaneous removal from the buffer of the data associated with the earliest picture in the buffer. In this example, the pictures are shown to be removed at a constant interval of time T. In general, the picture display interval, i.e., the time interval between the removal of consecutive pictures, may be variable.

For the bit stream to satisfy the MPEG rate control requirements, it is necessary that all the data for each picture be available within the buffer at the instant it is needed by the decoder and that the decoder buffer does not overfill. These requirements translate to upper and lower bounds on the number of bits allowed in each picture. The upper and lower bounds for a given picture depend on the number of bits used in all the pictures preceding it. For example, the second picture may not contain more than U2 bits since that is the number of bits available in the buffer when the second picture is to be removed, nor less than L2 bits since removing less than L2 bits would result in the buffer overflowing with incoming bits. It is a function of the encoder to produce bit streams that can be decoded by the VBV without error.

For constant-bit-rate operation, the buffer fullness just before removing a picture from the buffer is equal to the buffer fullness just before removing the previous picture minus the number of bits in the previous picture plus the product of the bit rate and the amount of time between removing the picture and the previous picture; i.e., buffer_fullness_before_remove_pic=buffer_fullness_before_remove_last_pic−bits_in_last_pic+time_between_pic_and_last_pic×bit_rate The upper bound for the number of bits in a picture is equal to the buffer fullness just before removing that picture from the buffer. The lower bound is the greater of zero bits or the buffer size minus the buffer fullness just before removing that picture from the buffer plus the number of bits that will enter the buffer before the next picture is removed. The buffer fullness before removing a given picture depends on the initial buffer fullness and the number of bits in all of the preceding pictures, and can be calculated by using the above rules.

Figure 8:
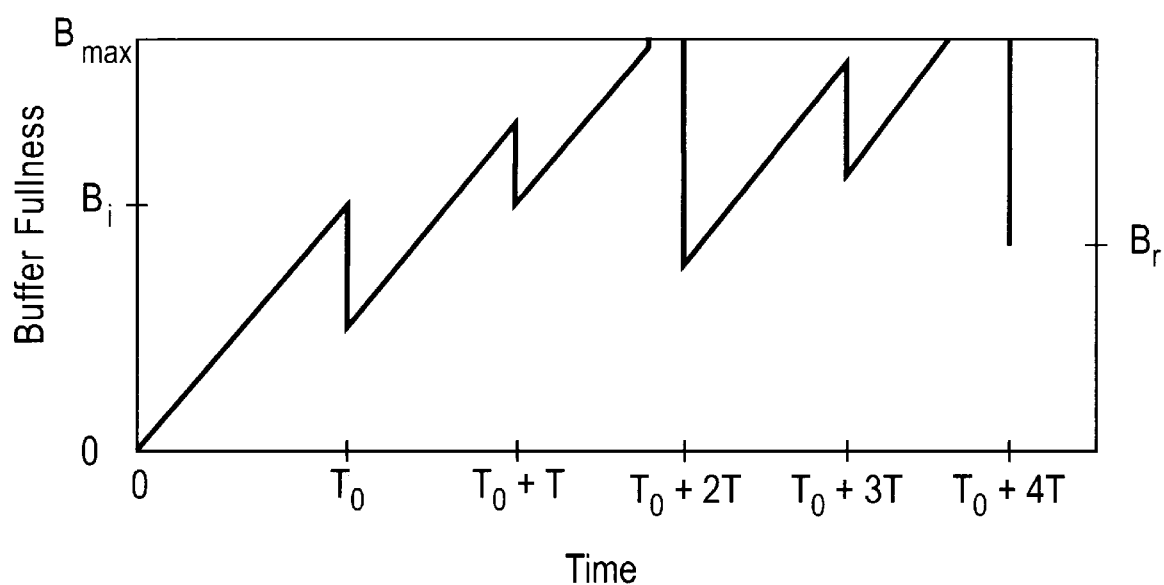
FIG. 8 shows an exemplary plot of the evolution of a virtual decoder buffer over time for operation in variable-bit-rate mode.

Variable-bit-rate operation is similar to the above, except that the compressed bit stream enters the buffer at a specified maximum bit rate until the buffer is full, when no more bits are input. This translates to a bit rate entering the buffer that may be effectively variable, up to the maximum specified rate. An example plot of the buffer fullness under variable-bit-rate operation is shown in FIG. 8. The buffer operates similarly to the constant-bit-rate case except that the buffer fullness, by definition, cannot exceed the buffer size of Bmax. This leads to an upper bound on the number of bits produced for each picture, but no lower bound.

For variable bit rate operation, the buffer fullness just before removing a picture from the buffer is equal to the size of the buffer or to the buffer fullness just before removing the previous picture minus the number of bits in the previous picture plus the maximum bit rate times the amount of time between removing the picture and the previous picture, whichever is smaller; i.e., buffer_fullness_before_remove_pic=min( buffer_size, buffer_fullness_before_remove_last_pic−bits_in_last_pic+time_between_pic_and_last_pic×bit_rate)

The upper bound for the number of bits in a picture is again equal to the buffer fullness just before removing that picture from the buffer. As mentioned, there is no lower bound. The buffer fullness before removing a given picture again depends on the initial buffer fullness and the number of bits in all of the preceding pictures, and can be calculated by using the above rules.

b. Preferred Embodiment of an Encoder

Figure 2:
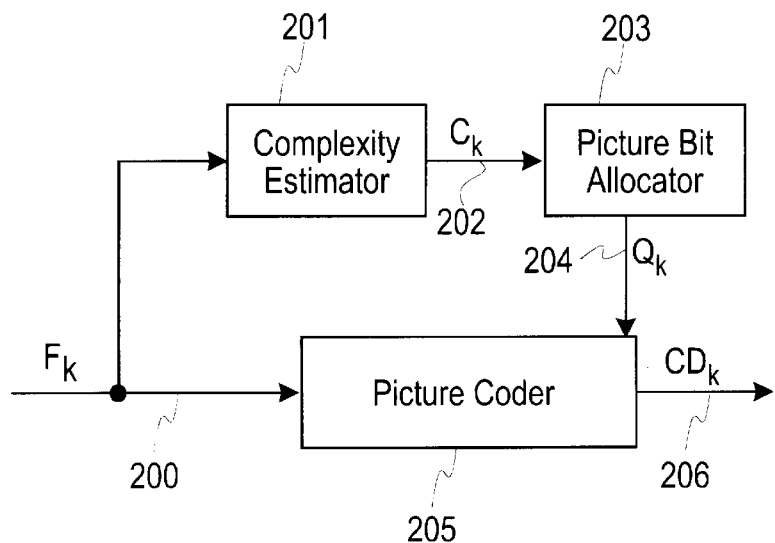
FIG. 2 is an overview of a conventional video compression system.
Figure 9:
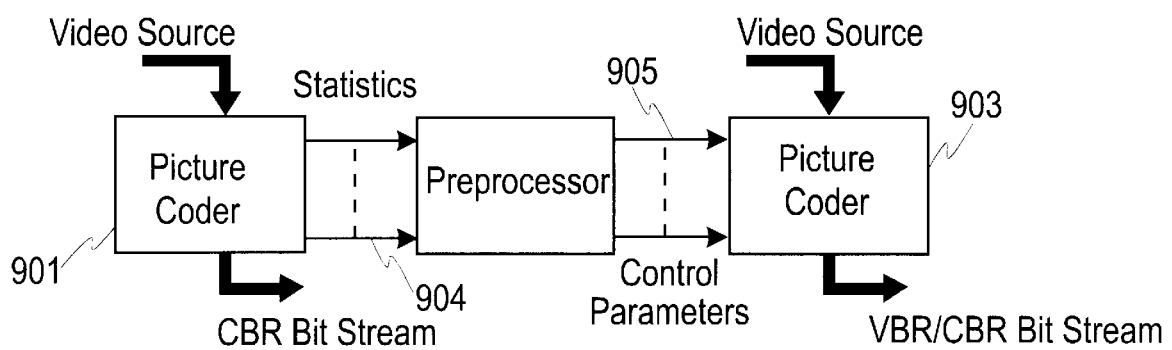
FIG. 9 shows an overview of a multi-pass encoding system.

FIG. 9 shows the components of an embodiment of the present invention and their interconnection. The Picture Coder 901 is of a conventional type, such as the Picture Coder 205 of FIG. 2. Certain picture coding characteristics 904 are inserted into the bitstream, which are extracted, filtered, analysed and further processed in the Preprocessor 902. The Picture Coder 903 is the same as Picture Coder 901, except that it does not use the embedded rate control mechansim, and is controlled by the Preprocessor 902 output 905 on a picture by picture basis.

In FIG. 9, a digital motion video sequence is first compressed in its entirety by the Picture Coder 901. The in this Picture Coder embedded rate control algorithm will be configured to produce a constant bit rate output. An example of such a rate control algorithm can be found in U.S. Pat. No. 5,231,484 to Gonzales and Viscito, which describes a rate control mechanism that can be used for MPEG.

As an example of the actual bit rate in bits per second that the rate control mechanism may operate on, in one embodiment the total number of bits available for the video, divided by its duration in seconds may be used. The total number of bits is a given from the application for which the encoder system is employed, and can for example be an allowable file size for a digital storage device, or that part of the total capacity of a Digital Video Disk (DVD) that is alotted to the video.

Typically, in MPEG encoding, a picture is encoded by setting a picture-global quantization scale, and will produce a certain number of bits for this picture. In one embodiment, these two picture attributes, quantization scale and produced number of bits, will determine a bit-production model. As an example of such a bit production model is bits_produced*quantization_scale=constant where the constant is different for each picture, and can be measured by multiplying the actual produced number of bits with the specific quantization scale value that was set while running the Picture Coder 901.

Besides the quantization scale and the number of bits produced per picture, other data items that are available per picture may be collected while running the Picture Coder 901. Examples of these are the picture type, the number of intra coded macro blocks, and a measure of the spatial activity. It is understood, that these and other typical picture coding characteristics may be collected to be used for compression properties analysis.

In one embodiment, the spatial activity of a picture is the average of the macroblock spatial activities. For each macroblock, first the average pixel luminance value is calculated. Next, the absolute difference between each pixel value and this average is accumulated, and averaged. This yields an absolute norm variance measure for each macroblock. The average over all macro blocks in the picture is then used as that picture spatial activity.

Since pictures in MPEG-2 are encoded in an order that may be different than the display order, it is understood that for processing purposes the picture data may first reordered into picture display-time sequential order.

Scene changes are detected, using the collected picture coding characteristics in display-time sequential order. In the preferred embodiment a simple threshold of the absolute difference between the spatial activities of successive pictures may be taken. Those skilled in the art may devise similar methods for scene change detection, possibly based upon measured other picture and sequence properties.

Fades from a regular scene to an all blank scene ("fade-out") and back to a possibly different scene ("fade-in") are also detected. In the preferred embodiment, first the blank pictures are detected, by searching for very low to zero picture spatial activities. From then on outwards, which means back and forwards in time, pictures are considered to be no longer part of the fade when the spatial activity no longer increases and has settled on a fairly constant and stable level. As a fade is a transition between two scenes, a scene change is inserted in the detected blank pictures region between the fade-out and the fade-in. It is understood that situations may arise where a blank region is only preceded by a fade-out and is not followed by a fade-in, or the blank region is not preceded by a fade-out and is only followed by a fade-in. In those situation, a scene change is also inserted in the blank region.

Detected scene changes and inserted scene changes in fades are next combined with start-of GOP-locations to subdivide the video sequence into many very short sequences (e.g. 15 pictures long). It is understood that for compression methods that do not have the explicit concept of GOPs, this can be introduced just for this sake of subdivision of the sequence into many small segments of pictures. In the preferred embodiment, the method for subdivision is to always use scene change locations as subdivision boundaries, and only use those start-of-GOP locations as subdivision boundaries when this does not create a segment smaller than some minimum size (e.g. 15 pictures). In case two scene changes (either detected or inserted in a fade) are so close to each other that a segment is created shorter than the minimum, then the scene change boundaries will still be used, and a segment smaller than the minimum number of pictures is created.

The gathered picture compression characteristics will next be filtered, based upon the subdivided sequence. More specifically, quantization scales will be calculated that would distribute the number of bits available for the segment over that segment, such that the quantization scale is the same for all pictures in that segment. Typically, the total number of bits available for a segment is the number of pictures in the segment N, multiplied the average number of available bits for one picture Ba. The latter is calculated in turn by the ratio of the total number of available bits for the entire video sequence, and the number of pictures in that sequence. It is understood that in order to relate the quantization scale to the number of bits available in the segment, a bit production model as discussed above is used.

At this point, the Picture Coder 901 has been run for an entire video sequence, and several picture encoding characteristics have been collected. Further, the gathered picture-by-picture quantization scales have been filtered by using a subdivision of the sequence into many small segments, appropriately aligned with scene change positions.

The next objective of the present invention is to encode the entire video sequence through again, but now through the Picture Coder 903. This Picture Coder 903 is the same as the Picture Coder 901, except that it bypasses the in Picture Coder 901 embedded rate control mechanism. Thus, in this next second pass through the video data, the quantization scales are set not by the embedded rate control mechanism, but under outside control of precalculated quantization scale values per picture. These preset picture quantization scale values can be calculated to produce two signficantly different types of bitstream, one of which is for a constant bit rate, whilst the other method would produce a variable bit rate, with only a certain maximum bit rate. Whereas the latter, the constant bit rate, must observe both the lower and upper VBV buffer boundaries, the variable bit rate needs only to observe the lower VBV buffer boundary.

To calculate quantization scales to produce a constant bit rate bitstream when running the entire video sequence through the Picture Coder 903, the problem is formulated as a constrained quadratic programming problem. The constraints are the buffer boundaries that may not be exceeded, while the minimization criterion is the sum of differences between the reciprocal quantization scales of two adjacent pictures. In this, is must be taken into account that the (reciprocal) quantization are adjacent, but that adhering to the buffer boundary constraints is done in coding order. Hence some re-ordering bookkeeping must be observed when formulating the problem as such a "constrained least squares" problem. Mathematical methods are well known to solve these types of problems. In one embodiment, the optimization method may be applied to each of the shorter segments of pictures as described above, but another, preferred, embodiment solily uses the scene change locations to subdivide the entire video sequence into smaller segments. It is understood that those skilled in the art may find other ways to subdivide the sequence into smaller time-segments. The solution of the such formulated optimization problem will yield a quantization scale for each picture in the entire sequence, while the lower and upper buffer boundaries will not be violated by using these quantization scales.

To calculate quantization scales to produce a variable bit rate bitstream when running the entire video sequence through the Picture Coder 903, the quantization scales for each picture are based upon setting a constant quantization scale for each smaller time-segment of pictures as described above. In the preferred embodiment, the target quantization scale setting Qt is based upon the measured and then filtered (as described in the above) quantization settings Qf the following formula:

$$Qt=(Qf\char`\^0.6)$$

where "^" means "to the power of". The corresponding target number of bits for each picture is next calculated via the measured bit production model. Since the sum of these target bit productions will generally not add up to the total number of bits available for the entire sequence, each picture quantization scale Qt will be multiplied with a factor, which is the same for all pictures, such that to these multiplied values of Qt corresponding target bit productions will exactly add up to the total number of bits available for the entire sequence. In one other exemplary embodiment, the quantization scale values Qt may be calculated with $$Qt=(c1+c2*Qf)$$

where c1 and c2 are constants as they for example may be determined by experiment to obtain a specific visual video appearance or quality distribution with the variable bit rate encoding. An example of values for these constants are c1=1.2 and c2=0.2. Those skilled in the art will be able to define other formulas of setting the quantization scales, and it is thus understood that these embodiments serve as a mere example of how to set a quantization scale for each picture that achieve a variable bit rate bitstream.

The lower buffer boundary for variable bit rate is made to be observed for the smaller time-segments of pictures. First, the target quantization scales Qt are determined for each picture. Then, for each segment, it is calculated what the minimum constant quantization scale over the whole segment may be so that the buffer just not underflows. A short algorithm will next compare these two values for each segment, and if buffer underflow is detected for the segment, the minimum value will be used instead of the calculated values Qt. In that case, for those segments this will free up some bits, which will be distributed over all other segments. This is repeated, until all segments are guaranteed to observe the lower buffer boundary, and all freed-up bits are redistributed. All pictures in one segment are assigned the same (constant) quantization scale as was assigned to the whole segment.

Figure 10:
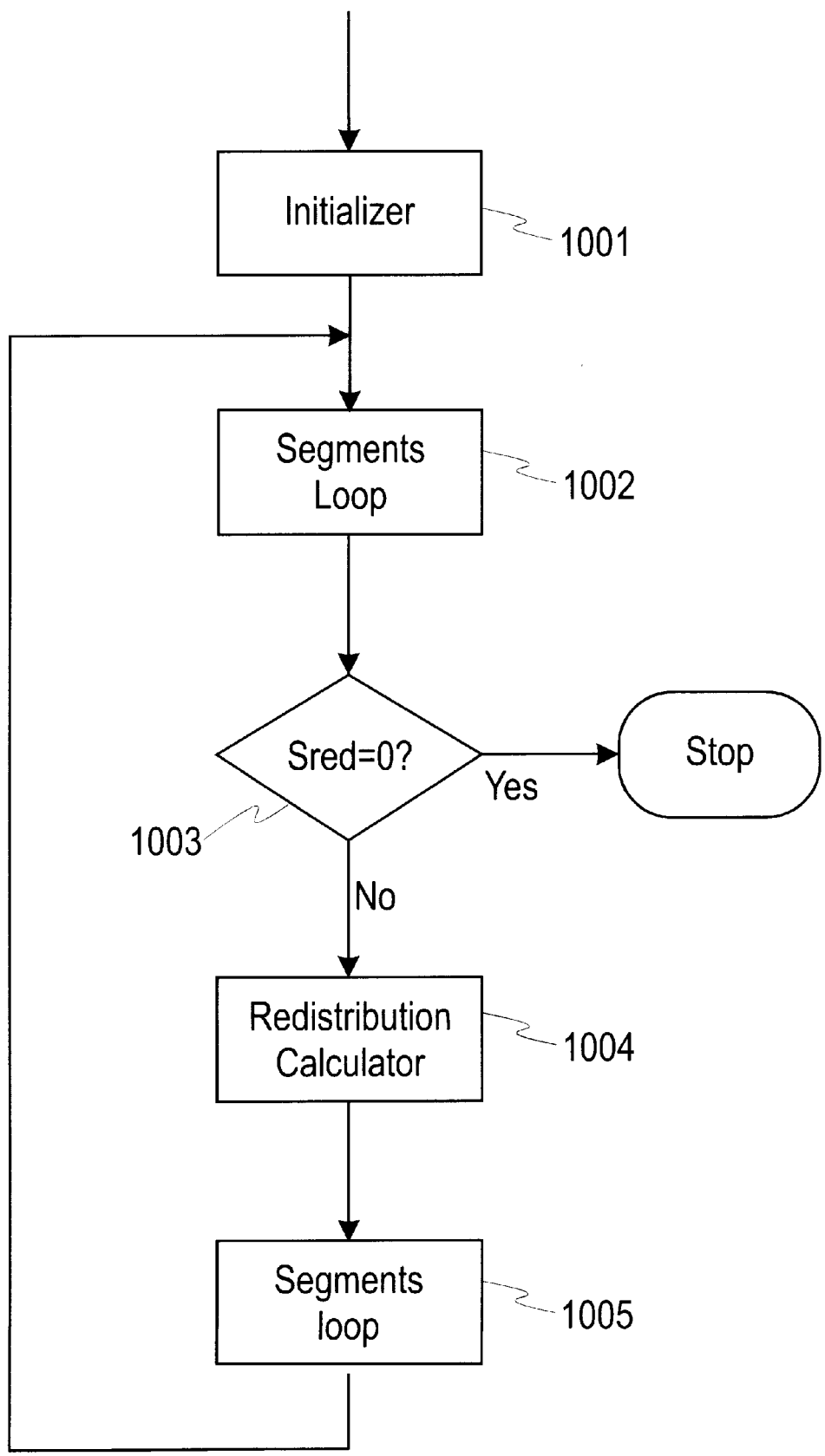
FIG. 10 is a flow diagram of the buffer underflow prevention method for preparing the quantization scales for second pass variable bit rate operation.

A more detailed description of the procedure of preventing buffer underflow for variable bit rate operation is shown in FIG. 10. The Initializer 1001 sets-up and prepares the variables for the procedure:

Zero the sum of bits to redistribute: Sred=0.

Zero the total sum of target bits of all segments that are still eligible to receive more bits: Selig=0.

First Segment Loop 1002

For every segment k for which fk<1, decrease the corresponding targets by multiplying them by fk.

Add the number of bits that become available to the sum of bits to redistribute Sred.

The multiplication factor of this segment will be adjusted to exactly 1, which also indicates it has been handled and cannot receive additional bits.

For the segments that have fk>1, add the picture targets to the total sum of target bits Selig.

Skip segments that have fk=1.

The Stop Criterion 1003

If Sred equals 0, there were no more segments found (anymore) with fk<1: stop.

Redistribution Multiplication Factor Calculator 1004 fred=1+(S red/Selig).

Second Segment Loop 1005

For the segments that have fk>1, multiply the targets by fred.

Adjust the segment multiplication factor fk by dividing it by fred.

Skip segments that have fk=1 (after the first segment loop 1002, there should be no segments left with fk<1).

Since fred>1, the second segment loop 1005 for fk>1 could result in some segments to get a fk<1, so the iterative algorithm returns to the first segment loop 1002.

Finally, in order to ensure a total bit production very close to the total number of available bits for the entire sequence, a controller will monitor the actual bit production per picture, and compare this with the targeted picture bit production. The mismatch in form of the difference between these two quantities will be accumulated, and used to adjust the quantization scale settings of future.

For example, in the preferred embodiment, the adjusted quantization scale Qa is calculated by dividing the target quantization scale Qt by one minus a constant c times the accumulated bit production mismatch delta:

$$Qa=Qt/(1-c*\text{delta})$$

The constant c, a smearing factor, is a small number, where in one embodiment it is the reciprocal value of two times the VBV buffer size. Those skilled in the art may devise similar methods for bit production mismatch control, and/or use different and possibly non-constant values for c. Thus, it should be understood that this preferred embodiment has been provided as an example and not as a limitation.

While the invention has been described for MPEG encoding, it can be used with other video coding techniques or even with non-video data. Indeed, any digital information can be segmented into coding units, and bits allocated to the coding units (for fixed rate or variable rate encoding). The coding units can then be encoded based on the allocation. The techniques described for bit allocation will work whether or not the data is video. For example, digitized speech can be segmented into one millisecond frames (these audio frames would play the same role as the video pictures) and bits can be allocated for each millisecond of audio (the coding units).

Now that the invention has been described by way of the preferred embodiment, various modifications and improvements will occur to those skilled in the art. Thus, it should be understood that the preferred embodiment has been provided as an example and not as a limitation. The scope of the invention is defined by the appended claims.

We claim:

1. A method for setting bit allocation and quantization scale targets for a second pass of variable bit rate by allocating certain number of bits to each short segment of ordered coding units:

the lower buffer boundary is observed, comprising the steps of:

initialize initial values;

loop over all segments to determine if there is an underflow of the lower buffer boundary, and if said lower buffer boundary is underflowed, then decrease the target number of bits for each coding unit in the segment so that the lower buffer boundary is no longer underflowed;

accumulate the decreased said amount of bits to accumulated amount;

if said accumulated amount is zero, then said bit allocation is complete;

if said accumulated amount is not zero, the redistribute said accumulated bits over those segments for which there was no underflow of said lower buffer boundary;

relooping over all segments until accumulated amount is zero.

2. A method for controlling the bit production of the compression of ordered coding units, comprising the steps of:

setting a target bit production and associated quantization scale on a coding unit by coding unit basis;

adjusting the target quantization scale setting into the actual value by using an accumulated bit production mismatch and a smearing factor;

encoding a coding unit with the adjusted quantization scale setting;

updating the cumulative bit production mismatch with the difference between the target bit production and the actually produced number of bits.

* * * * *